Sept. 7, 1926.
W. MARSHALL
FASTENER FOR TRIMMING MATERIAL
Filed August 25, 1924 2 Sheets-Sheet 1
1,599,139
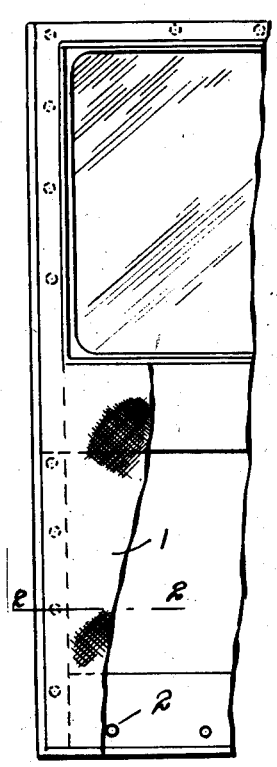
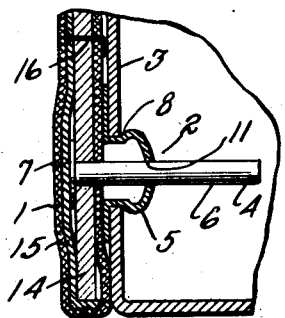
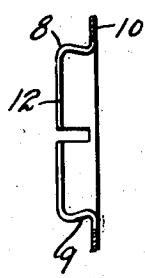
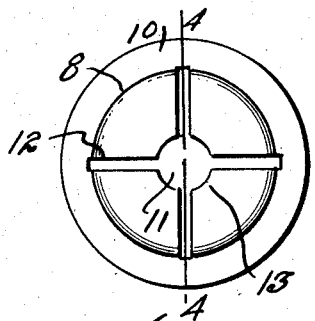
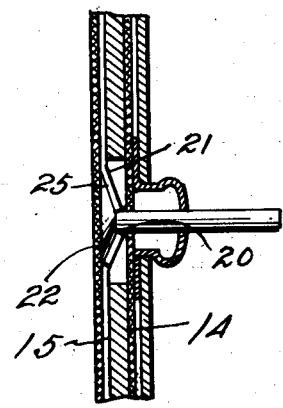
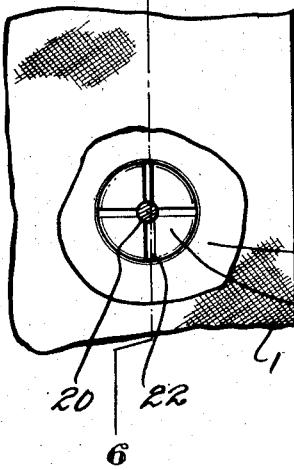
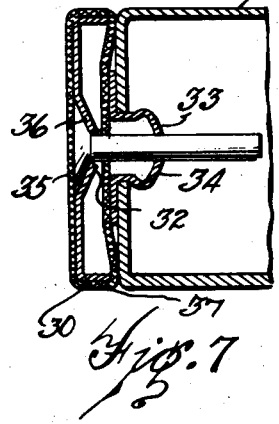
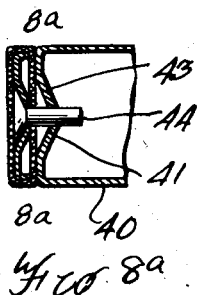
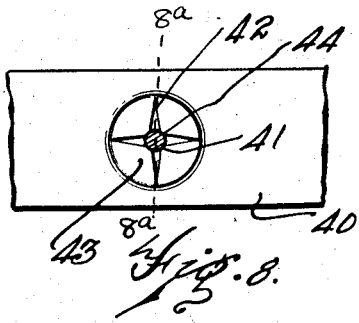
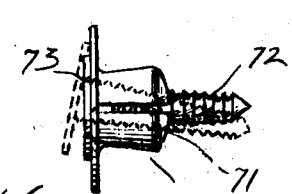
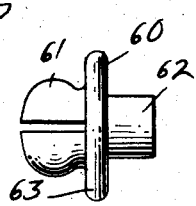
INVENTOR.
William Marshall
BY
ATTORNEYS.

Sept. 7, 1926.  W. MARSHALL  1,599,139
FASTENER FOR TRIMMING MATERIAL
Filed August 25, 1924   2 Sheets-Sheet 2
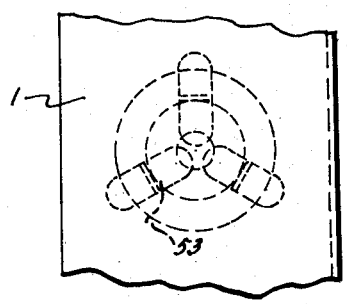
Fig. 9
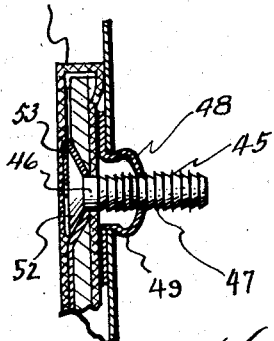
Fig. 10
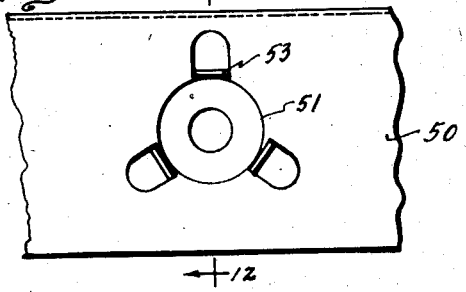
Fig. 11
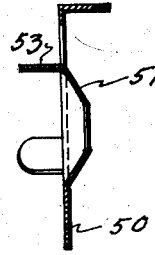
Fig. 12
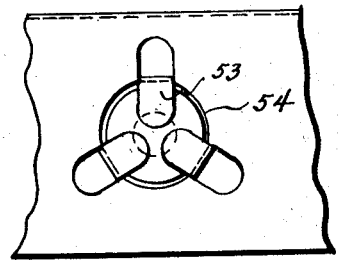
Fig. 13
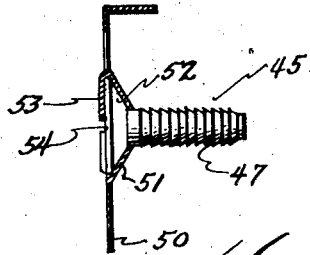
Fig. 14
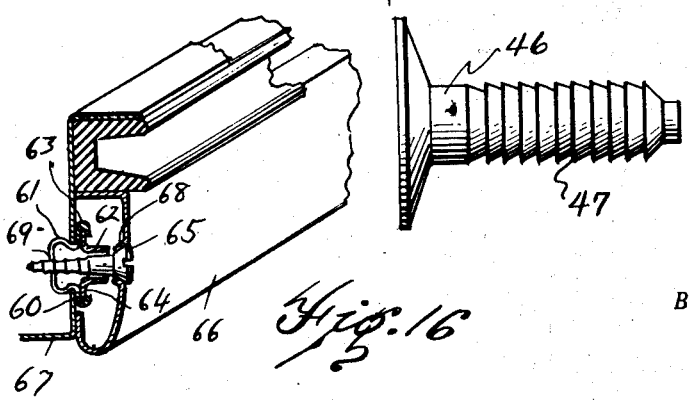
Fig. 16
Fig. 15
INVENTOR.
William Marshall
BY
ATTORNEYS Patented Sept. 7, 1926.

1,599,139

UNITED STATES PATENT OFFICE.

WILLIAM MARSHALL, OF DETROIT, MICHIGAN, ASSIGNOR TO BRIGGS MANUFACTURING COMPANY, OF DETROIT, MICHIGAN, A CORPORATION OF MICHIGAN.

FASTENER FOR TRIMMING MATERIAL.

Application filed August 25, 1924. Serial No. 734,127.

This invention relates to fasteners designed for attaching trimming material to the framework of vehicle bodies and consists of certain novel features of construction, combinations and arrangements of parts as will be more fully described and particularly pointed out in the appended claims.

In the accompanying drawings;

Figure 1 is a fragmentary side elevation of a vehicle body with parts broken away and showing my invention applied thereto;

Figure 2 is a sectional view taken on the line 2—2 of Figure 1.

Figure 3 is an enlarged top plan view of the socket member of my fastener;

Figure 4 is a sectional view taken on the line 4—4 of Figure 3;

Figure 5 is a fragmentary top plan view of a slightly modified form of construction;

Figure 6 is a sectional view taken on the line 6—6 of Figure 5;

Figure 7 is a cross sectional view of the construction illustrated in Figures 5 and 6 and showing the trimming material applied thereto and the same attached to the framework of a vehicle body;

Figure 8 is a sectional view through another modified form of construction;

Figure 8ª is a sectional view taken on the line 8ª—8ª of Figure 8.

Figure 9 is a fragmentary top plan view of another modified form of construction;

Figure 10 is a sectional view taken on the line 10—10 of Figure 9;

Figure 11 is a fragmentary top plan view of the construction shown in Figure 9 with the trimming material and bolt removed and showing the tongues in upright position.

Figure 12 is a sectional view taken on the line 12—12 of Figure 11;

Figure 13 is a view similar to Figure 11 but showing the tongues bent over the head of the pin;

Figure 14 is a sectional view taken on the line 14—14 of Figure 13;

Figure 15 is a detail elevation of the modified form of pin shown in Figure 10;

Figure 16 is a fragmentary perspective view of another modified form of construction.

Figure 17 is a detail elevation of still another modification.

Figure 18 is a detail elevation of the socket member shown in Figure 16.

Referring now to the drawings in which like characters of reference designate corresponding parts, throughout the several views, the numeral 1 designates the panel of trimming material that is attached by means of the fasteners 2 to the sheet metal framework 3 of a vehicle body. As shown, each fastener preferably consists of a headed pin 4 and a cooperating socket member 5.

Each pin is provided with a long shank 6 and a relatively large head 7 while each socket member preferably consists of a hollow cup-shaped body 8 having a restricted neck 9 and a marginal flange 10. In order that the socket members may receive and hold the shanks 4 of the pins, the body portions 8 are provided with central openings 11 and the radial slits 12 thereby providing prongs 13 for engagement with the shanks 6 of the pins.

In order that a minimum number of fasteners will be required to attach the trimming material to the framework, I preferably provide the trimming material with a backing or stiffening member 14 that is preferably formed of cardboard through which the shanks 4 of the pins preferably extend. As shown, in Figure 2 of the drawing, the trimming material 1 is folded around the edges of the backing and is secured to the opposite side thereof. To provide straight edges for the folds, I preferably provide suitable metal strips 15 that are secured to the inner face of the backing at the edges thereof by relatively small tacks 16 and are provided at their outer edges with longitudinally extending flanges 18 that cover the edges of the backing.

In the process of construction, the shanks 6 of the pins are first driven through the backing 14, then the strips 15 are secured to the backing by means of the tacks 16, whereupon the trimming material 1 is placed over the backing and strips and is folded around the flanges 18 at the edges of the backing and is secured to the opposite side of the backing. The trimming material may then be attached to the framework of the vehicle body by merely pressing the shanks 6 of the pins between the prongs 13 of the cooperating socket members which will grip the shanks firmly so that the backing 14 and trimming material will be held securely in position.

In this connection it will be noted that the diameter of each socket member is much larger than the cross sectional area of each pin shank, hence the pins may be pressed into locking engagement with the prongs of the socket members while disposed at an angle thereto. This would occur when the pins and socket members were not in registration when the trimming material is applied to the frame work. Thus this freedom of angular movement of the pin shanks in the socket members will automatically take care of such irregularities in assembly.

In Figures 5 and 6 I have shown a slightly modified construction in which the shanks 6 of the pins are driven through openings 20 in the metal strips 15 as well as through enlarged openings 21 in the backing 14. In this construction the strips 15 are preferably provided around the openings 20 with radial slits 22 thereby providing prongs 25 which are pressed into the openings 21 in the backing by the heads 7 of the pins as shown in Figure 5 of the drawing so that the outer surfaces of the heads will be substantially flush with the outer surfaces of the strips.

In Figure 7 I have shown another modification in which the backing is preferably a channel-shaped strip 30 of light gauge metal. This form of backing is preferably used when it is desired to attach the trimming material to posts 31 or narrow portions of the vehicle body framework. With this construction the shanks 6 of the pins are preferably driven through suitable openings 32 in the base of the channel and are adapted to be held securely in position by means of the prongs 33 of the cooperating socket members 34 which correspond to the socket members 5. As shown, the bases of the channel-shaped strips 30 are preferably provided around the openings 32 with radial slits 35 to provide prongs 36 which are pressed inwardly by the heads of the pins as shown in Figure 6 of the drawing so that the outer surfaces of the heads will be flush with the outer surfaces of the bases of the channel-shaped strips.

As shown in Figure 7 of the drawing, the trimming material 1 conceals the heads of the pins and is preferably folded around the flanges 37, and is secured to the inner sides of the bases of the channel-shaped strips. Thus, when the shanks 6 of the pins are pressed between the prongs 34 of the socket members the flanges 37 will provide straight edges for the trimming material and will hold the latter against the framework of the vehicle body.

In Figure 8, I have shown another modified construction in which the framework 40 of the body is preferably provided with spaced openings 41 and radial slits 42 providing prongs 43 which are adapted to grip the shanks 44 of the pins instead of the prongs of the socket members shown in Figure 7 of the drawing.

In Figures 9 to 15 inclusive I have shown another modification in which the shanks 45 of the pins 46 are provided with substantially frustro-conical serrations 47 which are adapted to be engaged by the prongs 48 of the socket members 49. With this construction the metal backing strips 50 are preferably provided with embossed or counter-sunk portions 51 for receiving the beveled portions 52 of the heads of the pins 46 and are provided with struck-out tongues 53 that are preferably bent over the flat surfaces 54 of the heads of the pins 46 to secure the latter to the backing strips 50 as shown in Figures 13 and 14 respectively of the drawings.

In Figures 16 and 18 I have shown still another modification wherein the socket member 60 is formed of two sections 61 and 62 respectively. As shown, the section 61 corresponds to the socket member 5 except that the flange 63 thereof is preferably crimped over the flange 64 of the tubular section 62. This form of fastener is preferably, although not necessarily, employed to hold suitable screws 65 which are used to secure trimming material such as strips of channel molding 66, to the metal framework 67 of the vehicle body. Thus, with this construction, the screws 65 are inserted through suitable openings 68 in the molding 66 and are driven between the prongs 69 of the socket member 60. These prongs 69 will effectively hold the screws 65 while the tubular section 62 will maintain the shanks of the screws in centered position relative to the prongs.

In Figure 17 the socket member 70 is similar to the socket members 5 and is provided with prongs 71 which are adapted to engage and hold the threads 72 on suitable screws 73 used to secure the trimming material or other article (not shown) to the metal framework of the vehicle body. With this construction, the screws 72 are adapted to engage the prongs 71 on an angle as shown by dotted lines in Figure 17 so that the trimming material, molding, etc. may be readily attached to the metal framework of the body even though the socket member may be spaced apart improperly in the framework, or for any other reason the screws might be out of alignment with the socket members when the trimming material, etc., is applied to the framework.

From the foregoing description it will be readily apparent that I have provided an extremely simple fastener that can be manufactured at a comparatively low cost and which will permit the trimming material to be easily and quickly attached to the framework of the vehicle body. It will also be apparent that the flanges of the metal strips or channels will strengthen the construction in addition to providing straight edges for the folds of the trimming material. Inasmuch as the trimming material is provided with a backing or stiffening member, the fasteners may be spaced further apart so that only a few are required to secure the trimming material to the body framework.

While it is believed that from the foregoing description, the nature and advantages of the invention will be readily apparent, I desire to have it understood that I do not limit myself to what is herein shown and described and that such changes may be resorted to when desired as fall within the scope of what is claimed.

What I claim as my invention is:

1. The combination with a frame member having a sheet metal wall provided with a transverse opening, and trimming material therefor, of means for attaching said trimming material to said frame member including a resilient and independent socket member extending completely through the opening, the said socket member having a flange projecting laterally beyond the outer edges of the opening for limiting the inward movement of said socket member and having a portion extending laterally beyond the inner edges of said opening for limiting the outward movement of said socket member, the portion last mentioned being split into a plurality of prongs, and a headed element having the head thereof carried by said trimming material and having the shank thereof extending through the socket member and held by said prongs.

2. In a vehicle body, the combination with a frame member having a sheet metal wall, of a lining on said frame member including a sheet of fabric, a backing for said lining including a panel of rigid material, and means for attaching the lining to the frame member including a headed element having the head thereof secured to said backing and concealed by said lining, and a resilient and independent substantially cup-shaped socket member having a flange projecting laterally beyond the outer edges of said opening for limiting the inward movement of said socket member and having a bulging portion pressed through said opening, the diameter of said bulging portion being larger than the diameter of said opening whereby the bulging portion will prevent accidental outward displacement of the bulging portion, said socket member being divided longitudinally into a plurality of inwardly extending substantially L-shaped prongs gripping the shank of said pin.

3. The combination with a frame member having a sheet metal wall provided with an opening, of a lining on said frame member including a sheet of fabric, a backing for said lining including a panel of rigid material, and means for attaching the lining to the frame member including a headed element having the head thereof secured to said backing and having longitudinally spaced transversely extending serrations on the shank thereof, and a resilient and independent substantially cup-shaped sheet metal socket member having a flange at the open end thereof engageable with said wall for limiting the inward movement of the said socket member and having a bulging portion adapted to be pressed through said opening, the diameter of the bulging portion being larger than the diameter of said opening whereby the bulging portion will prevent accidental outward displacement of the socket member, bulging portion member being divided longitudinally into a plurality of inwardly extending substantially L-shaped prongs engaging the serrations on said shank for holding said headed element.

4. The combination with a frame member having a sheet metal wall provided with an opening therein, of a lining on said frame member including a sheet of fabric, a backing for said lining including a panel of rigid material, and means for attaching the lining to the frame member including a headed element having the head thereof secured to said backing, and a resilient and independent substantially cup-shaped socket member extending through said opening having a flange at the open end thereof projecting laterally beyond the outer edges of said opening for limiting the inward movement of said socket member and having a bulging portion preventing accidental outward displacement thereof, said bulging portion being divided longitudinally into a plurality of inwardly extending substantially L-shaped prongs gripping the shank of said headed element, the diameter of the socket member being materially larger than the cross sectional area of said shank so that the latter may be disposed at an angle to said member while held by said prongs.

5. The combination with a frame member having a sheet metal wall provided with a transverse opening, of trimming material on said frame member including a sheet of fabric, and a backing for said fabric including a panel of rigid material, and means for attaching the trimming material to said frame member including a headed element having the head thereof secured to said backing, and a resilient and independent socket member extending entirely through said opening having a flange extending laterally beyond the outer edges of said opening for limiting the inward movement of said socket member and having a portion extending laterally beyond the inner edges of said opening for preventing accidental outward displacement of said socket member from said opening, the last mentioned portion being split into a plurality of inwardly extending substantially L-shaped prongs gripping the shank of said headed element, the diameter of the socket member being materially larger than the cross sectional area of the shank so that the latter may extend through said socket member at an angle thereto for locking engagement with said prongs.

6. In a vehicle body, the combination with a frame member having a sheet metal wall, of trimming material on said frame member including a sheet of fabric, a backing for said sheet of fabric comprising a panel of rigid material, and means for attaching the trimming material to the frame member including a headed element having the head thereof carried by said trimming material, and a resilient and independent substantially cup-shaped socket member having a flange projecting laterally beyond the outer edges of said opening for limiting the inward movement of said socket member and having a bulging portion pressed through said opening, the diameter of said bulging portion being larger than the diameter of said opening, whereby the socket member will prevent accidental outward displacement of the bulging portion, said socket member being divided longitudinally into a plurality of inwardly extending substantially L-shaped prongs gripping the shank of said headed element.

7. The combination with a frame member having a sheet metal wall provided with an opening, of trimming material on said frame member including a sheet of fabric, a backing for said fabric comprising a panel of rigid material, and means for attaching the trimming material to the frame member including a headed element having the head thereof carried by said trimming material and having longitudinally spaced transversely extending serrations on the shank thereof, and a resilient and independent substantially cup-shaped sheet metal socket member having a flange at the open end thereof engageable with said wall for limiting the inward movement of the said socket member and having a bulging portion adapted to be pressed through said opening, the diameter of the bulging portion being larger than the diameter of said opening whereby the bulging portion will prevent accidental outward displacement of the socket member, said socket member being divided longitudinally into a plurality of inwardly extending substantially L-shaped prongs engaging the serrations on said shank for holding said headed element.

8. The combination with a frame member having a sheet metal wall provided with a transverse opening, of trimming material on said frame member including a sheet of fabric, and a backing for said fabric including a panel of rigid material, and means for attaching the trimming material to said frame member including a headed element having the head thereof carried by said trimming material, and a resilient and independent socket member extending entirely through said opening having a flange extending laterally beyond the outer edges of said opening for limiting the inward movement of said socket member and having a portion extending laterally beyond the inner edges of said opening for preventing accidental outward displacement of said socket member from said opening, the last mentioned portion being split into a plurality of inwardly extending substantially L-shaped prongs gripping the shank of said headed element, the diameter of the socket member being materially larger than the cross sectional area of the shank so that the latter may extend through said socket member at an angle thereto for locking engagement with said prongs.

9. The combination with a frame member having a sheet metal wall provided with an opening therein, trimming material on said frame member including a sheet of fabric, a backing for said fabric comprising a panel of rigid material, and means for attaching the trimming material to the frame member including a headed element having the head thereof carried by the trimming material, and a resilient and independent substantially cup-shaped socket member extending through said opening having a flange at the open end thereof projecting laterally beyond the outer edges of said opening for limiting the inward movement of said socket member and having a bulging portion preventing accidental outward displacement thereof, said bulging portion being divided longitudinally into a plurality of inwardly extending substantially L-shaped prongs gripping the shank of said headed element, the diameter of the socket member being materially larger than the cross sectional area of said shank so that the latter may be disposed at an angle to said member while held by said prongs.

In testimony whereof I affix my signature.

WILLIAM MARSHALL.